Sept. 7, 1954     A. S. RANKINE, JR     2,688,558
REFRACTORY INSULATING BRICK AND METHOD OF MANUFACTURE
Filed Dec. 23, 1950
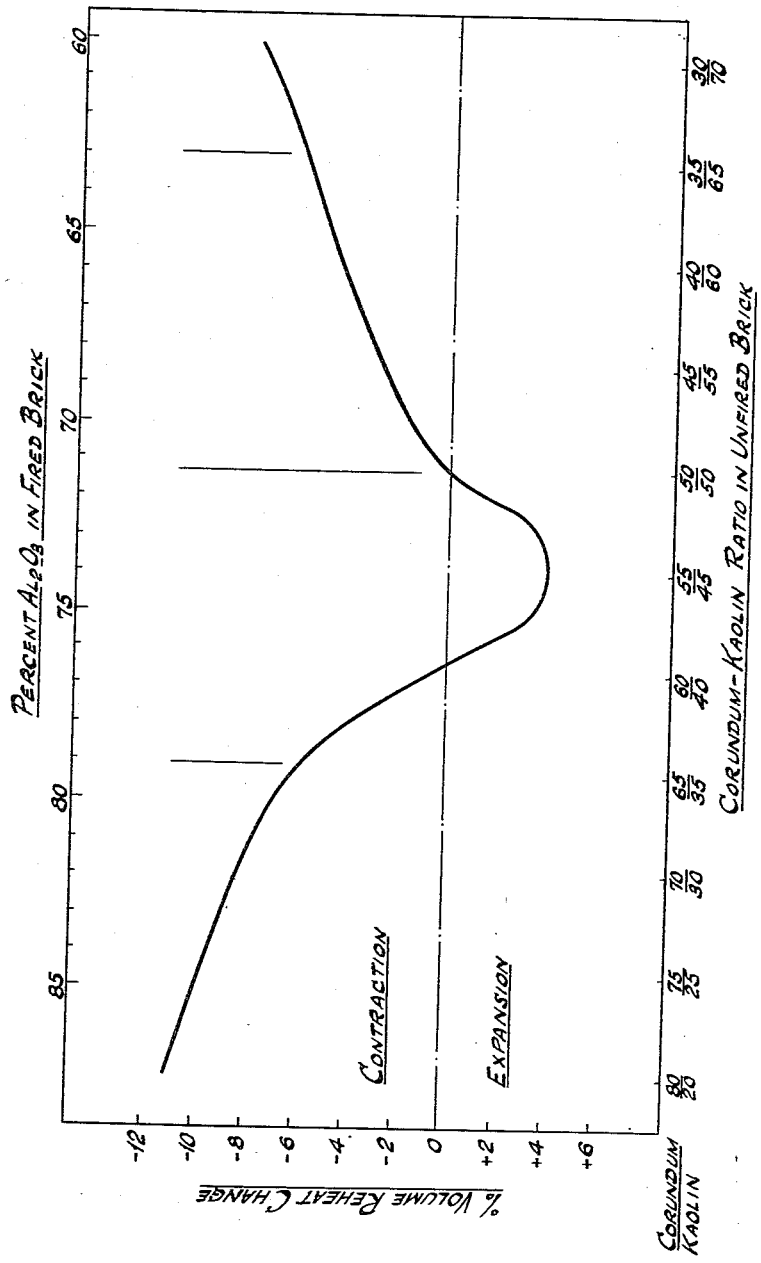
INVENTOR.
Adam S. Rankine Jr.
BY Nigil O. Kline
ATTORNEY.

Patented Sept. 7, 1954

2,688,558

UNITED STATES PATENT OFFICE 2,688,558

REFRACTORY INSULATING BRICK AND METHOD OF MANUFACTURE

Adam S. Rankine, Jr., Martinsville, N. J., assignor to Johns-Manville Corporation, New York, N. Y., a corporation of New York Application December 23, 1950, Serial No. 202,447

8 Claims. (Cl. 106—41)

This invention is concerned with the manufacture of light weight refractory insulating brick of substantial volume stability and strength at high temperatures and method of making the same.

This invention is a continuation-in-part of and improvement on that disclosed in my copending U. S. patent application Serial No. 778,030, filed October 4, 1947, for Refractory Insulating Brick and Method of Manufacture, now abandoned.

The conventional method of making lightweight refractory insulating brick involves preparation of a molding batch incorporating plastic clay, grog and organic material, molding the mixture to shape and drying, and burning out the organic filler material during a firing treatment carried out at approximately the temperature at which the brick is to be used. It has been found difficult to develop an insulating brick of suitable low density for good heat insulation properties at high temperatures, by reason of the serious loss of compressive strength and volumetric stability which accompanies the development of porosity in the brick during the burn-out and firing treatment. It has not been found possible heretofore to produce insulating brick of below 65 lbs./cu. ft. density suitable for use as furnace linings exposed to temperatures in the neighborhood of 3000° F., because of the undesirable amount of volume shrinkage and spalling which takes place in the brick produced by conventional methods for such service.

A primary object of the present invention is to provide a refractory insulating brick of light weight which will withstand service at temperatures in the neighborhood of 3000° F. without serious spalling and shrinkage or expansion.

Another object is to provide a light weight refractory insulating brick which exhibits good compressive strength and resistance to thermal shock under exposure to furnace temperatures of 2600–3000° F.

A further object is to provide an economical and efficient method of making high temperature insulating brick of high quality.

With the above objects in view the invention consists in the improved refractory insulating brick and method of manufacture which are hereinafter described and more particularly defined by the accompanying claims.

In the following disclosure reference will be made to the attached drawing, in which the single curve plots the effect of alumina content of corundum-kaolin refractory insulating brick averaging 65 lbs./cu. ft. density, on volume change during reheat firing for five hours at 3000° F.

The light weight refractory insulating brick which forms the subject of the present invention incorporates as its principal constituents a fine grained kaolin clay of high purity, and finely divided corundum of high quality containing at least 89% aluminum oxide by weight. The term "corundum" is used herein in its generally accepted sense to cover both natural corundum and artificial corundum comprising sintered or fused alumina in which the alpha-alumina crystal form predominates. It has been found that by firing a molded batch containing the proportions of high grade corundum and kaolin which are hereinafter more fully set forth, to a temperature of about 2600° F., bricks can be produced which exhibit substantial volume stability and resistance to spalling under exposure to temperatures up to and including 3000° F. The refractory insulating bricks are not only suitable for service up to 3000° F. but it has been found that they develop relatively low processing shrinkage and minimum processing cracks, warping and deformation during manufacture. Furthermore, the present brick exhibits exceptionally high transverse and compressive strength and good spalling resistance, as compared to bricks made by conventional methods in which the volume shrinkage tendencies are neutralized by substituting calcined clay, grog or other non-plastic minerals for part of the raw bonding clay.

The following allowable and preferred batch mixtures have proven effective for producing refractory insulation bricks having exceptionally good volume stability and strength as well as spalling resistance, when exposed to temperatures in the range 2600–3000° F.:

|  | Formula I | Preferred Formula II |
|---|---|---|
|  | Percent | Percent |
| Corundum (89–99.5% Al₂O₃) | 23–42 | 23–32.5 |
| Kaolin | 23–42 | 32.5–42 |
| Grog | 0–30 | 20 |
| Sawdust | 10–20 | 15 |

A preferred kaolin is one of uniform grain structure and high purity having a pyrometric cone equivalent (PCE) of at least cone 33. A good grade of Georgia kaolin or washed Florida kaolin meets the preferred specification. The corundum should have an alumina content not substantially lower than 89% and should be ground to pass a standard 100 mesh screen. The grog is preferably made of burned brick of the same kind as that produced by the present process and is preferably ground to pass a standard 20 mesh screen. The sawdust preferably consists of white and yellow pine ground to pass a 14 mesh screen.

When employing corundum of at least 99% alumina content, a preferred molding batch is one containing approximately 29% corundum, approximately 36% kaolin, 20% grog and 15% sawdust. A suitable molding batch is prepared by dry mixing the pulverized kaolin, sawdust, grog and corundum, and subsequently mixing the dry-mix material with water in proportions of about 2 lbs. of dry batch with approximately 1 lb. of water. The plastic mixture which is thus formed is molded into forms of convenient size, and the molded bricks are subsequently subjected to a slow drying treatment at a temperature not exceeding about 250° F. The dried bricks are then fired in an oxidizing atmosphere to a final temperature usually of about 2600° F. over a firing cycle which is long enough to develop optimum porosity and suitable volume stability and strength.

Fired bricks which are thus produced are substantially unvitrified and do not develop a linear reheat shrinkage in excess of 2% when exposed as part of a furnace wall to firing temperatures of 3000° F. for five hours. Such bricks have a density ranging from 55-70 lbs./cu. ft., a transverse strength of 150-275 lbs./sq. in., and compressive strength of 150-250 lbs./sq. in. During molding and drying the bricks develop a processing linear shrinkage which does not exceed about 4%.

A suitable batch formula for use with corundum of 89% alumina content, calls for approximately 33% corundum, 33% kaolin, 20% grog and 15% sawdust. Bricks produced by this alternative formula exhibit good volume stability over the temperature range of 2600-3000° F., but do not have quite as good transverse and compressive strength as compared to bricks manufactured in accordance with the preferred formula employing corundum of over 99% $Al_2O_3$ content. A brick satisfactory for 2800° F. service can be made in which the corundum content of the molding batch is as low as 20% for corundum of about 99.5% $Al_2O_3$ content, or about 25% for corundum of about 89% $Al_2O_3$ content.

As previously indicated, the primary advantage of the brick forming the subject of the present invention is that they exhibit reheat stability at 3000° F. even though the initial firing temperature does not go above 2600° F. It is believed to be an exceptional characteristic of the present brick that they need only be fired to the relatively low temperature of 2600° F. in order to develop substantial volume stability for service at temperatures of 3000° F. It is believed that the exceptional volume stability and strength of the present brick under 3000° F. service results from the high alumina content developed in the brick by employing as the primary components of the molding batch a corundum of exceptionally high alumina content and a high grade of fine grained kaolin binder. Bricks made in accordance with the allowable formula range containing corundum of 89-99.5% alumina content always analyze approximately 63-79% alumina and 21-37% silica. Bricks manufactured in accordance with the preferred formula analyze approximately 63-71% alumina and 29-37% silica.

Bricks made in accordance with the present formulas exhibit greater strength and volume stability as compared to any bricks heretofore known to have been manufactured of comparable composition. Corundum has heretofore been proposed as a component of refractory insulation brick, by reason of its exceedingly refractory properties and low thermal expansion characteristics when heated over the normal firing temperature range. The present insulation brick exhibit much greater volume stability and much greater strength than was to have been expected from prior experience with the molding and firing of refractory insulating brick containing commercial corundum and bonding clay in the proportions called for, for the manufacture of brick suitable for use at reheat firing temperatures of 3000° F. The preferred brick composition includes corundum-kaolin ratios of between 35/65 and 50/50; and the resulting fired brick of approximately 63-71% alumina content and 65 lbs./cu. ft. density have suitable strength and volume stability within the allowable volume shrinkage of 6% (2% maximum linear shrinkage).

The invention which has thus been described by detailed example is not limited as to such details and it is to be understood that variations, changes and modifications are contemplated within the scope of the invention as defined by the following claims.

What I claim is:

1. A refractory insulating brick having a density of 55-70 lbs./cu. ft. and having such volumetric stability as not to exceed approximately 6% volume change over the temperature range 2600-3000° F., comprising the substantially unvitrified fired reaction product of finely divided kaolin and finely divided corundum of 89-99.5% alumina content in approximately the dry weight proportions yielding a product containing approximately 63-79% alumina and 21-37% silica.

2. A refractory insulating brick having a density not substantially exceeding 65 lbs./cu. ft. and such volumetric stability as not to exceed approximately 6% volume change up to 3000° F., comprising the substantially unvitrified fired reaction product of finely divided kaolin and finely divided corundum of about 89-99.5% alumina content in the approximate dry weight proportions yielding a product containing approximately 63-71% alumina and 29-37% silica.

3. A moldable and heat-curable composition adapted for the manufacture of refractory insulating brick having a density of 55-70 lbs./cu. ft., comprising a water-plasticized mixture of up to 30% grog, 10-20% organic burn-out material, finely divided corundum of 89-99.5% alumina content, and fine grained high purity kaolin, the dry weight ratio of corundum and kaolin yielding a fired product containing approximately 63-79% alumina and 21-37% silica and which is stable against volume change in excess of 6% when fired for several hours at a temperature in the range of 2600-3000° F.

4. A refractory insulating brick having a density of 55-70 lbs./cu. ft. and which has such volume stability as not to exceed approximately 6% volume change up to 3000° F., comprising the substantially unvitrified fired reaction product of a molding batch comprising corundum of at least 89% alumina content and fine grained high purity kaolin in the dry weight ratio limits of 35/65-50/50, said brick containing approximately 63-71% alumina and 29-37% silica and having a linear shrinkage of not to exceed about 2% when fired for several hours at a temperature in the range 2600-3000° F.

5. In the manufacture of refractory insulating brick having a density of 55-70 lbs./cu. ft. and such volumetric stability as not to exceed approximately 6% volume change up to 3000° F., the steps comprising, forming a plastic molding batch comprising finely divided corundum of 89-99.5% alumina content, finely divided kaolin, water, and 10-20% by weight of organic burn-out material, molding and firing the product to a temperature of about 2600° F., and proportioning the corundum and kaolin within the dry weight ratios of 35/65-65/35 to develop in the product an alumina to silica ratio of approximately 63-79% alumina to 21-37% silica.

6. In the manufacture of light weight insulating brick having a density of 55-70 lbs./cu. ft. and such volumetric stability as not to exceed approximately 6% volume change up to 3000° F., the steps comprising, forming a molding batch comprising finely divided kaolin and finely divided corundum of 89-99.5% alumina content, together with water, up to 30% grog and 10-20% sawdust, molding and firing the product to a temperature adequate to develop suitable strength and proportioning the components of said batch to include about 63-71% dry weight of alumina and 29-37% dry weight of silica.

7. In the manufacture of refractory insulating brick having a density of 55-70 lbs./cu. ft. and such volumetric stability as not to exceed approximately 6% volume change up to 3000° F., the steps comprising, forming a plastic molding batch comprising 23-42% finely divided corundum of 89-99.5% alumina content, 23-42% finely divided kaolin having a PCE of at least cone 33, approximately 20% grog, 15% sawdust, and water, molding the batch to brick form, and firing to a temperature of about 2600° F.

8. In the manufacture of refractory insulating brick having a density of 55-70 lbs./cu. ft. and such volumetric stability as not to exceed approximately 6% volume change up to 3000° F., the steps comprising, forming a plastic molding batch comprising finely divided corundum of about 99% alumina content, and finely divided kaolin having a PCE of at least cone 33 in the dry weight ratio of between 35/65 and 50/50, up to 30% grog, 10-20% sawdust, and water, molding the batch to brick form, and firing to a temperature developing suitable volume stability and strength.

References Cited in the file of this patent

UNITED STATES PATENTS

| Number | Name | Date |
| --- | --- | --- |
| 700,673 | Buchner | May 20, 1902 |
| 1,520,487 | Tone | Dec. 23, 1924 |
| 2,104,609 | Leeuw | Jan. 4, 1938 |
| 2,340,194 | McMullen | Jan. 25, 1944 |
| 2,363,146 | Robie | Nov. 21, 1944 |

FOREIGN PATENTS

| Number | Country | Date |
| --- | --- | --- |
| 158,336 | Germany | 1905 |